United States Patent [19]

Giglia

[11] 4,344,674
[45] Aug. 17, 1982

[54] ELECTROCHROMIC DISPLAY DEVICE WITH IMPROVED ERASING CHARACTERISTIC

[75] Inventor: Robert D. Giglia, Rye, N.Y.

[73] Assignee: American Cyanamid Company, Stamford, Conn.

[21] Appl. No.: 157,612

[22] Filed: Jul. 18, 1980

[51] Int. Cl.³ .............................................. G02F 1/17
[52] U.S. Cl. .................................................... 350/357
[58] Field of Search ........................................ 350/357

[56] References Cited

U.S. PATENT DOCUMENTS 3,978,007  8/1976  Giglia et al. ......................... 350/357
4,174,152  11/1979  Giglia et al. ......................... 350/357

Primary Examiner—James W. Davie
Attorney, Agent, or Firm—Gordon L. Hart

[57] ABSTRACT

An electrochromic device having an electrochromic layer of persistent electrochromic material such as tungsten oxide, and an electrolyte layer and a counter electrode which comprises an oxidizing agent which has oxidizing electrode potential more negative than the electrochromic layer to provide a stored charge for erasing color from the electrochromic layer, and to increase the emf of the charge used for the erase function. Examples of suitable oxidizing agents are manganese dioxide and chromic oxide.

12 Claims, 1 Drawing Figure

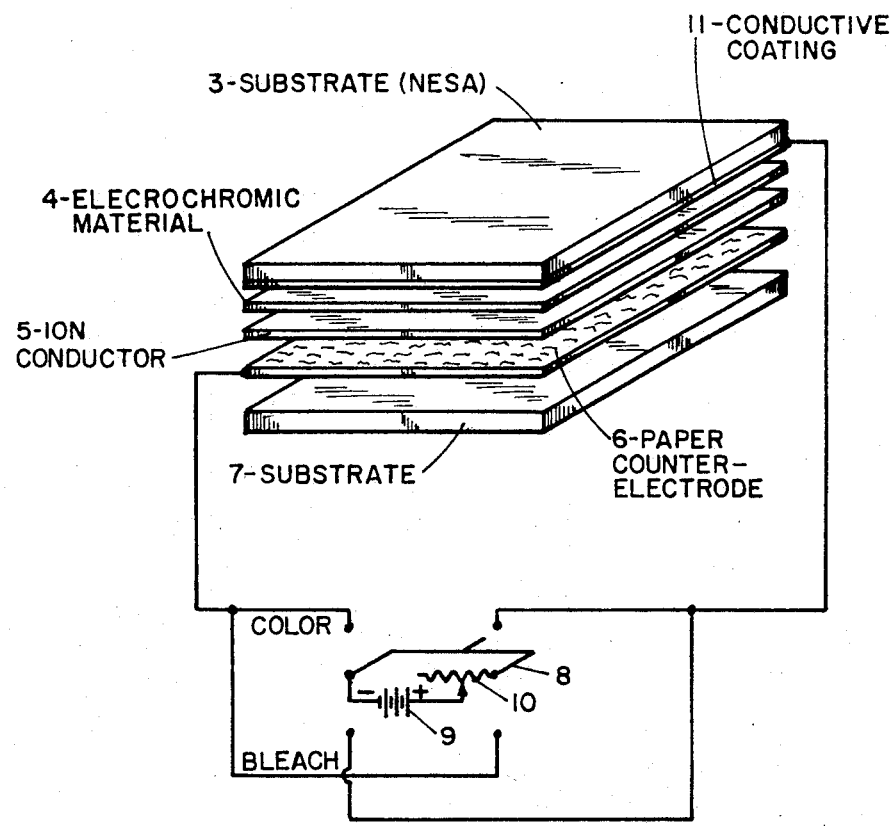

ELECTROCHROMIC DISPLAY DEVICE WITH IMPROVED ERASING CHARACTERISTIC

The invention relates to improvements in persistent electrochromic devices for image display, for light filtering, etc. Such devices comprise a film of inorganic persistent electrochromic material and an ion-conductive insulating layer which functions as an electrolyte layer. The film and electrolyte layer are in surface contact with each other for exchange of ions between the electrochromic film and the electrolyte layer. A counter electrode layer capable of storing counter-ions contacts the other side of the electrolyte layer. When tungsten oxide is the electrochromic material the counter-ion is a positively charged ion, preferably a proton, or lithium ion. Two conductive electrode layers are disposed on the opposite outer surfaces of the film and counter electrode to provide means for applying emf across the combined thickness of the electrochromic film and the electrolyte layer. A number of persistent electrochromic devices of this kind have been described for several uses. The combination described is provided with external electrical means for applying emf to the electrodes to cause coloration of the electrochromic layer. By reversing the polarity of the two electrodes and applying emf, the colored electrochromic layer will be uncolored (erased) by the reversed flow of current. The film will be persistent in either its colored state or its non-colored state, without the need for continuous current or emf to maintain the state. In some embodiments, the coloration can be erased by simply short circuiting the electrodes through an external circuit, there being enough internally stored charge to supply the reversed current required to erase the coloration in the electrochromic layer.

In accordance with the present invention, in a device of the kind described, the counter electrode in contact with the electrolyte layer contains an oxidizing agent for the purpose of increasing the emf of the internally stored charge in the device. This increased charge will increase the speed of erasing at a given voltage or on short circuit.

The drawing is an exploded view of a device in which the invention may be embodied. Referring now to the drawing the invention will be described in more detail.

In a device embodying the invention the electrochromic film 4 is a thin, solid film of inorganic material, usually tungstic oxide. The film may be of another inorganic transition metal compound having the persistent electrochromic property as has already been described in numerous prior art references. The electrolyte layer 5 may be a liquid electrolyte solution of the kinds described in earlier literature, but in our most preferred embodiments we use a solid or viscous layer of an ion-exchange resin, such as polystyrene sulfonic acid, polyvinyl sulfonic acid, copolymers having acid functional groups, and the like, some of which have been described for example in U.S. Pat. No. 4,174,152. The conductive electrode next to the electrochromic film is usually a transparent conductive layer 11 such as a thin layer of $SnO_2$ on a glass substrate 3, e.g. NESA ® glass. Typically, the electrochromic layer 4 will also be supported by the same substrate, coated over the conductive layer on the support. For a counter electrode in accordance with the present invention we provide a layer 6 of conductive material, either a self-supporting layer or on a supporting substrate. Most preferred is a layer of conductive carbon comprising particulate carbon particles with binders and the like either on a substrate 7 or as a self-supporting layer.

In accordance with the invention there is dispersed in the counter electrode an oxidizing agent having electrode potential more negative than that of inert carbon, such as manganese dioxide, chromic oxide, or other oxidizing agent, which will increase the open circuit potential when the electrochromic layer is in its colored state. At least a stoichiometric amount of the oxidizing agent is used, but in practice we provide more than the stoichiometric amount.

By means of such an oxidizing agent in the counter electrode the invention provides means within the device itself for internally storing a charge and to provide increased emf for more rapidly erasing the electrochromic layer when the stored charge is discharged through the electrochromic layer. In some embodiments the increased erasing speed on short circuit will be sufficient to eliminate the need for additional external current supply for the erasing function. This improvement can significantly simplify the external circuitry needed to operate the device. On the coloration cycle, this improved device may require a slightly higher emf than would be needed to fully color at equal speed a device having no oxidizing agent in the counter electrode. The current needed for coloration in a device embodying the invention must be sufficient not only to color the electrochromic layer but also to recharge the oxidizing agent in the counter electrode. To maintain a desired coloring speed, a device embodying the invention may require a higher voltage for coloration than would be required by a device without the invention.

The persistant electrochromic material of the electrochromic layer changes color by reversible electrochemical redox reactions. The most used persistent electrochromic material is tungsten oxide. The exact nature of the reversible reactions is not known. In the uncolored condition, the tungsten oxide is believed to be an oxidation state between +6 and +5. In the colored state the oxidation state is less positive, closer to +5.

In a typical device, the open circuit potential of the colored tungsten oxide electrode against an inert carbon counter electrode is 0.65 volt. When we provide in the counter electrode an oxidizing agent which is more oxidizing than an inert carbon positive electrode in the same device, the open circuit potential of the device with the electrochromic layer colored will be increased. By using manganese dioxide in the carbon counter electrode, the open circuit potential when the electrochromic layer is colored will be increased from 0.65 to 0.98 theoretical. We refer to Latimer, W. M., *Oxidation Potentials*, Prentice-Hall, Inc., 2nd edition 1952. At page 255, Latimer lists a half reaction potential for the couple $W_2O_5 + H_2O = 2WO_3 + 2H^+ + 2e^-$ at +0.03 volt related to the hydrogen reference couple and at page 241 for the couple $Mn^{+3}/Mn^{++}$ at −0.95. Thus the theoretical open circuit potential, the sum of the two half reaction potentials, is 0.98.

By increasing the negative potential of the counter electrode, the erasing speed has been increased. In prior art is was known to include electrochromic tungsten oxide in the counter electrode to increase the coloring speed of the device. The present invention increases erasing speed at some expense of coloring speed for the same applied potential.

For use of the invention in a device which can be readily colored and discolored over many cycles we select an oxidizing agent which is readily reversible by electrochemical reactions, between its two oxidation states. The selected compound, after it has worked in the erasing function is readily rechargeable by electrochemical oxidation to its higher oxidation state during the coloration function in the operating cycle of the device. We prefer to use manganese dioxide as the selected oxidizing agent. Another suitable oxidizing agent is $CrO_3$.

In the following examples a preferred embodiment of the invention is described in more detail and some advantages of the invention are demonstrated by reference to a comparative example.

EXAMPLE 1

An electrochromic device is made as described in U.S. Pat. No. 4,088,395 having a film of electrochromic tungsten oxide coated in segments to form a numeric display pattern on the conductive electrode layer of a NESA glass plate. Over the tungsten oxide film is coated an electrolyte layer of copolymer resin having sulfonic acid functional groups. The coated resin layer is slightly wetted by exposure to humid atmosphere for several hours and it contains titanium dioxide pigment. A carbon paper counter electrode sheet is prepared as described in Examples 1 and 2 of U.S. Pat. No. 4,088,395 except the sheet is not coated with electrochromic $WO_3$ solution. The conductive carbon sheet is pressed between the electrolyte resin layer of the tungsten oxide electrode and a counter electrode substrate of NESA glass. The finished structure is essentially the same as that shown in the drawing.

A second device is prepared the same as above except in the suspension of fibers and carbon and binders prepared for making the carbon paper electrode, there is included an oxidizing agent consisting of manganese dioxide. The mixture consists of:

78 ml of acrylic fiber pulp
0.88 ml of Magnifloc 1563c 0.2% aqueous solution
0.44 ml of Surfonic N-120 10% in water
0.33 ml of 60% Teflon 30B suspension
1.60 g of Cabot XC72R carbon powder
0.75 g of B&A reagent grade $MnO_2$
320 ml deionized water This suspension is mixed thoroughly and poured on a papermaking screen to make a carbon paper electrode which differs from the paper electrode of the first device only by its content of $MnO_2$.

Both devices were tested by applying a DC potential across the electrodes, with the tungsten oxide side negative, to produce the same selected degree of coloration in the electrochromic layer of each device. To obtain the same coloration in the device containing the oxidizing agent, either a slightly higher voltage or a slightly longer period for coloration was required.

The first colored device had open circuit potential measured at 0.65 volt and the second colored device which contained $MnO_2$ had open circuit potential of 0.92. When the electrodes of each device were short circuited through an external circuit, the first erased in about 1.0 to 1.2 seconds while the device containing $MnO_2$ in the counter electrode erased in only 0.6 second. A further increase of erasing speed results when the erase function is carried out with applied external voltage. Devices made according to this example have passed five million switching cycles (color-erase) without failure and without significant degradation of quality.

EXAMPLE 2

A carbon paper counter electrode sheet is prepared as described in Examples 1 and 2 of U.S. Pat. No. 4,088,395 except the sheet is not coated with electrochromic $WO_3$ solution. Chromium trioxide is dissolved in deionized water 1g/50 ml. The solution is coated on to one side of the counter electrode and heated to 70° C. for one hour. The resulting loading is 4 mg/cm$^2$ of $CrO_3$.

A third electrochromic device is assembled as in Example 1 above except that $CrO_3$ oxidizing agent is used in place of $MnO_2$ in the carbon paper member of the counter electrode. The open circuit potential of this device was 0.91 volt and the coloration was erased in only 0.5 second under short circuit condition. Devices made according to this example have passed one million switching cycles (color-erase) without failure and without significant degradion of quality.

We claim:

1. An electrochromic device comprising a film of persistant electrochromic inorganic compound, an electrode layer on one side of said film, an electrolyte layer on the opposite side of said film, a conductive counter electrode layer on the opposite side of said electrolyte layer, said counter electrode layer comprising an electrochemically reversible oxidizing agent having oxidizing electrode potential more negative than carbon to increase the open circuit potential of said device when the film of electrochromic material is in its colored state.

2. An electrochromic device defined by claim 1 wherein said oxidizing agent is manganese dioxide.

3. An electrochromic device defined by claim 1 wherein said oxidizing agent is chromic oxide.

4. An electrochromic device defined by claim 1 wherein said counter electrode layer comprises carbon with said oxidizing agent dispersed therein.

5. An electrochromic device defined by claim 4 wherein the dispersed oxidizing agent is manganese dioxide.

6. An electrochromic device defined by claim 4 wherein the dispersed oxidizing agent is chromic oxide.

7. An electrochromic device defined by claim 1 wherein the defined persistent electrochromic inorganic compound is electrochromic tungsten oxide.

8. An electrochromic device defined by claim 4 wherein the persistent electrochromic layer is electrochromic tungsten oxide and the oxidizing agent in the counter electrode layer is manganese dioxide.

9. An electrochromic device defined by claim 4 wherein the persistent electrochromic layer is electrochromic tungsten oxide and the oxidizing agent in the counter electrode layer is chromic oxide.

10. An electrochromic device defined by claim 7 wherein the defined electrolyte layer comprises ion conductive electrically insulating polymeric resin.

11. An electrochromic device defined by claim 10 wherein the defined oxidizing agent is manganese dioxide.

12. An electrochromic device defined by claim 10 wherein the defined oxidizing agent is chromic oxide.

* * * * *